Oct. 27, 1931.  N. P. MINSTER  1,829,666
VALVE STRUCTURE
Filed Nov. 19, 1929
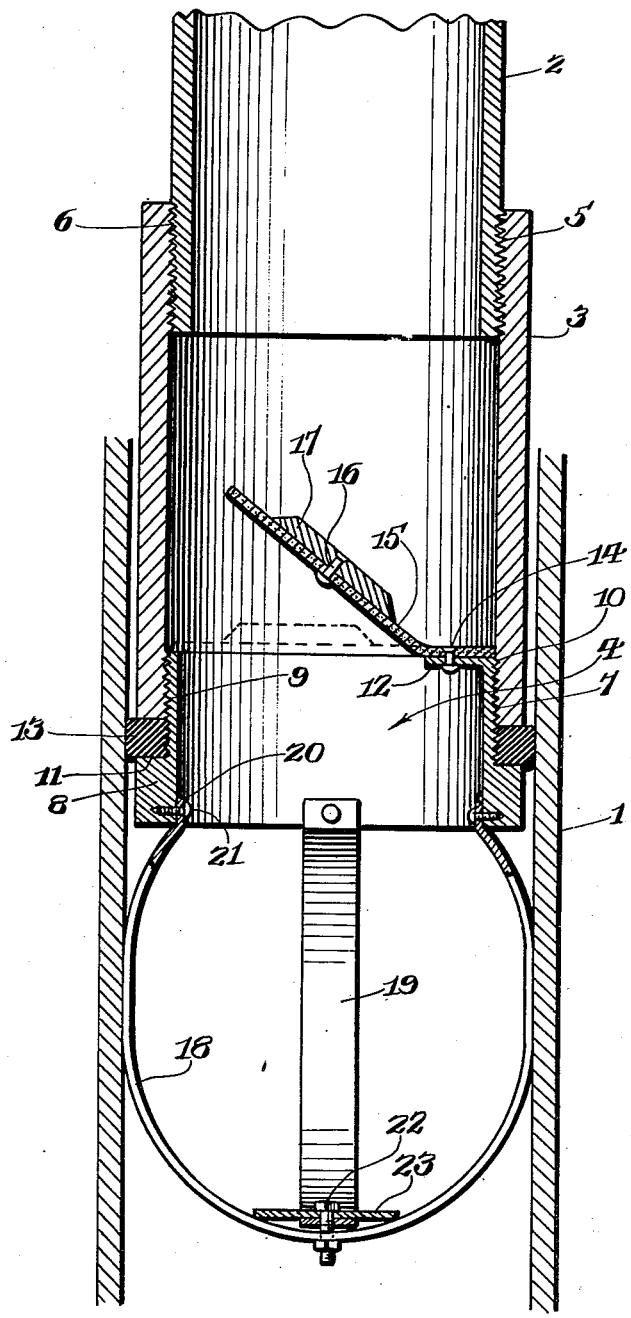
INVENTOR.
Norman P. Minster,
BY
Geo. F. Kimmel
ATTORNEY.

Patented Oct. 27, 1931

1,829,666

UNITED STATES PATENT OFFICE

NORMAN P. MINSTER, OF PARMA, IDAHO

VALVE STRUCTURE

Application filed November 19, 1929. Serial No. 408,377.

This invention relates to a valve structure for use in connection with suction lines of water pumps, and has for its object to provide, in a manner as hereinafter set forth, a structure of the class referred to including means for sealing out air from above when the structure is installed in the line whereby the column of water raised cannot be affected by atmospheric pressure and the pump go out of prime by sucking air, as the pump will draw the water with such force to be supplied to its full capacity.

A further object of the invention is to provide, in a manner as hereinafter set forth, a valve structure for the purpose referred to providing for the pumping of water from a greater depth and with greater volume than that now obtained from the means generally employed at present.

A further object of the invention is to provide, in a manner as hereinafter set forth, a valve structure designed primarily for use in connection with centrifugal pumps employed in cased wells and with the structure including means for sealing out air from above, resulting in thoroughly efficient operation of the pump and further preventing the pump from going out of prime by sucking in air.

Further objects of the invention are to provide, in a manner as hereinafter set forth, a valve structure for the purpose referred to which is simple in its construction and arrangement, strong, durable, thoroughly efficient in its use, conveniently installed, readily assembled and comparatively inexpensive to set up.

With the foregoing and other objects in view the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

The drawing illustrates in vertical section the suction line within a cased well and further showing the adaptation with the line of a valve structure in accordance with this invention.

Referring to the drawing 1 denotes a well casing, 2 a suction line leading to a pump, not shown, and 3 a coupling member between the line 2 and the valve structure referred to generally at 4. The coupling member is in the form of a sleeve and provided near its upper end with internal threads 5 for engagement with the peripheral threads 6 formed on the lower end of the line 2. The coupling member 3 at the lower portion of its inner face is provided with threads 7 for a purpose to be presently referred to. The line 2 extends into the upper end of the sleeve 3 and the lower end of line 2 is spaced a substantial distance from the threads 7 formed on the inner face of the member 3 to prevent the lower end of line 2 from interfering with the opening of the valve member of the valve structure to be presently referred to.

The valve structure 4 comprises an annular body portion formed of a thick lower part 8 and a thin upper part 9. The inner face of the part 9 is flush with the inner face of the part 8. The part 9 is of greater height than the part 8. The part 9 is formed with peripheral threads 10. The part 8 projects laterally with respect to the part 9 and provides an annular seat 11. The part 9 at its top is formed with an inwardly extending flange 12 of the desired cross sectional length and which provides a support for a valve member to be presently referred to.

Mounted upon the seat 11 is an expansible annulus 13 which snugly engages the lower portion of the threaded outer face 10 of part 9. The annulus 13 is in the form of a heavy rubber expansion ring and projects from the outer periphery of the part 8. The function of the annulus 13 will be presently referred to.

Connected to the support 12 by the holdfast devices 14 is a valve member 15 of the flap type and which preferably is constructed of leather. Carried by the valve member 15, positioned against the outer face thereof and secured therewith by the holdfast device 16 is a weight 17 normally tending to maintain the valve member in closed position with respect to the part 9. When the valve member 15 is in closed position it is seated upon the top edge of the part 9 of the body of the valve structure.

Depending from the part 8 of the body of the valve structure is a pair of vertically disposed holder members 18, 19 of bow-shaped contour, arranged at right angles to each other and formed from straps of spring steel. The upper ends of the members 18, 19, indicated at 20 are disposed perpendicularly and seated against the inner face of part 8 of the body of the valve structure. The ends 20 are fixedly secured to the body of the valve structure by holdfast devices 21 which extend through said ends and engage in the part 8. The members 18 and 19 bind against the inner face of casing 1.

The members 18, 19 centrally of their bottoms are connected together by a coupling bolt 22 which passes through a plate 23 seated upon the member 19 and the latter extends through the member 18. The bolt 22 is used to hold the members 18, 19 spaced relatively to each other and also with respect to casing 1 and the plate permits for the adjustment of the size of the space between the spring members and which can be obtained by tightening or loosening the bolt 22.

The holder members 18, 19 function to maintain the body of the valve structure stationary while the suction pipe is being turned down. This action presses down on the annulus 13, causing it to expand against the casing 2 and providing a seal, or in other words, sealing the air from the well, and which causes the water in the well to remain at it natural level, regardless of how much water is taken out, as the air being shut out, the water can only replace itself with more water.

When the annulus 13 is expanded it provides for sealing out air from above, under such conditions the column of water raised cannot be affected by atmospheric pressure and the pump put out of prime by sucking air, and as the pump will draw the water with the necessary force the pump will be supplied to its full capacity. As the well is sealed from above, the pump will operate in a thoroughly efficient manner and will not get out of prime. The arrangement of the elements will provide for the pumping of the water from a greater depth and with greater volume than that now generally obtained from the means now employed for such purpose.

It is thought the many advantages of a valve structure, in accordance with this invention can be readily understood, and although the preferred embodiment of the invention is as illustrated and described, yet it is to be understood that changes in the details of construction can be had which fall within the scope of the invention as claimed.

What I claim is:

1. A valve structure for connection to a suction line comprising an annular body portion for positioning in a well casing, said body portion having a peripherally threaded upper part of reduced outer diameter providing said body portion with a circumferentially extending seat, a coupling member attached to said part for connecting said body portion with the suction line, a compressible, expansible element mounted on said seat and extending circumferentially of said part and compressed by said member and engaging when compressed said casing to provide an air tight seal between the casing and body portion, oppositely disposed holding springs of strap like form, depending from the body portion and each bent upon itself and engaging diametrically opposed portions of the inner face of the casing to prevent the turning of the body portion during the compression of said element, each of said holding springs having the upper ends thereof secured to diametrically opposed portions of the inner face of said body portion, and a flap valve connected to one side of and seating on the upper end of said body portion.

2. A valve structure for connection to a suction line comprising an annular body portion for positioning in a well casing, said body portion having a peripherally threaded upper part of reduced outer diameter providing said body portion with a circumferentially extending seat, a coupling member attached to said part for connecting said body portion with the suction line, a compressible expansible element mounted on said seat and extending circumferentially of said part and compressed by said member and engaging when compressed said casing to provide an air tight seal between the casing and body portion, oppositely disposed holding springs of strap like form, depending from the body portion and each bent upon itself and engaging diametrically opposed portions of the inner face of the casing to prevent the turning of the body portion during the compression of said element, each of said holding springs having the upper ends thereof secured to diametrically opposed portions of the inner face of said body portion, a flap valve connected to one side of and seating on the upper end of said body portion, said holding springs disposed at right angles to each other and one arranged within the other, and means for adjustably connecting the bottoms of said holding springs together.

3. A valve structure for connection to a suction line including an annular body portion for positioning in a well casing, said body portion having a peripherally threaded upper part of reduced outer diameter thereby providing a circumferentially extending seat, said part having its top formed with an inwardly extending flange, a coupling member attached to said part for connecting said body portion to the suction line, a compressible expansible element mounted on said seat and extending circumferentially of said part and compressed and extended by said member and engaging when compressed said casing to provide an air tight seal between the casing and body portion, oppositely disposed holding springs of strap like form, depending from said body portion and each bent upon itself and engaging diametrically opposed portions of the inner face of the casing to prevent the turning of the body portion during the compression of said element, each of said holding springs having its upper ends connected to diametrically opposed portions of the inner face of said body portion at the lower end of the latter, said springs being disposed at right angles to each other, and a flap valve connected to said flange and seating on the top of said part.

4. A valve structure for connection to a suction line including an annular body portion for positioning in a well casing, said body portion having a peripherally threaded upper part of reduced outer diameter thereby providing a circumferentially extending seat, said part having its top formed with an inwardly extending flange, a coupling member attached to said part for connecting said body portion to the suction line, a compressible, expansible element mounted on said seat and extending circumferentially of said part and compressed and extended by said member and engaging when compressed said casing to provide an air tight seal between the casing and body portion, oppositely disposed holding springs of strap like form, depending from said body portion and each bent upon itself and engaging diametrically opposed portions of the inner face of the casing to prevent the turning of the body portion during the compression of said element, each of said holding springs having their upper ends connected to diametrically opposed portions of the inner face of said body portion at the lower end of the latter, said springs being disposed at right angles to each other, a flap valve connected to said flange and seating on the top of said part, and means for adjustably connecting said springs together.

5. A valve structure for connection to a suction line including a body portion of annular form for positioning in a well casing, said body portion having a peripherally threaded upper part of reduced outer diameter thereby providing a circumferential seat, a coupling member attached to said part for connecting said body portion to the suction line, a compressible, expansible element carried by said seat and extending circumferentially of said part and compressed and extended by said member and engaging when compressed said casing to provide an air tight seal between the casing and body portion, a weighted flap valve member connected to and seated on the top of said part, and resilient holding means depending from and connected to said body portion and engageable with the casing to prevent the turning of the body portion during the compression of said element.

6. In a valve structure for use in suction lines, in combination a valved controlled tubular member for insertion within the line and carrying a compressible sealing means, a pair of upstanding bow-shaped resilient holder elements disposed at right angles to each other, one arranged within and seating centrally of its bottom upon the center of the bottom of the other and each for bearing against diametrically opposite points of the inner face of the line below said member, each of said elements having a pair of perpendicular end portions for bearing against diametrically opposite points of the inner face of said member, means for fixedly securing each of said end portions to said member, a plate seated upon the upper face of said inner element centrally thereof and extending upon the upper face of the other element, and means common to said elements and plate for detachably securing them together.

In testimony whereof, I affix my signature hereto.

NORMAN P. MINSTER.